United States Patent
Sato (10) Patent No.: US 7,642,931 B2
(45) Date of Patent: Jan. 5, 2010

(54) DRIVING SUPPORT IMAGE-DISPLAY APPARATUS AND PROGRAM THEREFOR

(75) Inventor: Yuji Sato, Kariya (JP)

(73) Assignee: DENSO CORPORATION, Kariya (JP)

( * ) Notice: Subject to any disclaimer, the term of this patent is extended or adjusted under 35 U.S.C. 154(b) by 318 days.

(21) Appl. No.: 11/707,959

(22) Filed: Feb. 20, 2007

(65) Prior Publication Data

US 2007/0229310 A1   Oct. 4, 2007

(30) Foreign Application Priority Data

Mar. 17, 2006  (JP)  ............................... 2006-074985

(51) Int. Cl.
*G08G 1/123* (2006.01)
(52) U.S. Cl. .................... 340/995.1; 340/905; 340/436; 701/300; 701/23
(58) Field of Classification Search .............. 340/995.1, 340/995, 995.2, 995.24, 995.25, 995.27, 340/995.26, 995.28, 436, 903, 905; 701/300, 701/301, 23, 28
See application file for complete search history.

(56) References Cited

U.S. PATENT DOCUMENTS

| | | | | |
|---|---|---|---|---|
| 6,351,707 | B1 * | 2/2002 | Ichikawa ..................... | 701/209 |
| 6,472,977 | B1 * | 10/2002 | Pochmuller .............. | 340/425.5 |
| 6,847,338 | B2 * | 1/2005 | Abe et al. ...................... | 345/60 |
| 6,930,662 | B2 * | 8/2005 | Aoki ........................... | 345/87 |
| 7,092,819 | B2 * | 8/2006 | Odachi et al. ................ | 701/211 |
| 7,379,813 | B2 * | 5/2008 | Kubota et al. ................ | 701/211 |
| 7,403,219 | B2 * | 7/2008 | Miyashita et al. ........... | 348/148 |
| 2002/0061226 | A1 * | 5/2002 | Kodama et al. ................ | 404/14 |
| 2006/0139488 | A1 * | 6/2006 | Suzuki et al. ................ | 348/513 |

FOREIGN PATENT DOCUMENTS

| | | |
|---|---|---|
| JP | A-11-064018 | 3/1999 |
| JP | A-2001-101595 | 4/2001 |
| JP | A-2004-077281 | 3/2004 |
| JP | A-2005-011251 | 1/2005 |
| JP | A-2005-011252 | 1/2005 |
| JP | A-2005-014543 | 1/2005 |
| JP | A-2005-039547 | 2/2005 |
| JP | A-2005-0141543 | 6/2005 |
| JP | A-2005-207943 | 8/2005 |

* cited by examiner

*Primary Examiner*—Daniel Previl
(74) *Attorney, Agent, or Firm*—Posz Law Group, PLC (57) ABSTRACT

A driving support image during a turn at an intersection is provided as a driving support by a driving support image display apparatus for a driver by the image display apparatus so that the driver can easily recognize a state ahead of his or her vehicle or a state into which the right turn is made. The driving support image is provided when a subject vehicle has reached a support starting point before the intersection based on provided information that is received from a roadside apparatus. After starting the display of the driving support image as an initial field of vision, the support image is shifted by gradually moving the field of vision of the driving support image from the initial field of vision at a predetermined timing for increased coverage of an opposite lane or a lane to be traveled after a turn.

8 Claims, 7 Drawing Sheets

DRIVING SUPPORT IMAGE-DISPLAY APPARATUS AND PROGRAM THEREFOR

CROSS REFERENCE TO RELATED APPLICATION

This application is based on and claims the benefit of priority of Japanese Patent Application No. 2006-74985 filed on Mar. 17, 2006, the disclosure of which is incorporated herein by reference.

FIELD OF THE INVENTION

The present invention relates to a driving support image-display apparatus for displaying support information to help a driver, based on information about an oncoming vehicle etc. received from an external source, to sight the oncoming vehicle etc. when making a turn (Note: Supposing the case of left-hand traffic, hereafter described as a "right turn." It is equivalent to a left turn in the case of right-hand traffic) followed by crossing an opposite lane at an intersection.

BACKGROUND INFORMATION

In recent years, a safety system etc. for preventing accidents have been developed. Such a safety system is the one which obtains information about existence of vehicles and pedestrians around a self-vehicle and their locations through roadside apparatuses and vehicle-to-vehicle communications at specific areas including an intersection and displays support images indicating locations of those vehicles, pedestrians, etc. on a monitor screen.

Figure 7A:
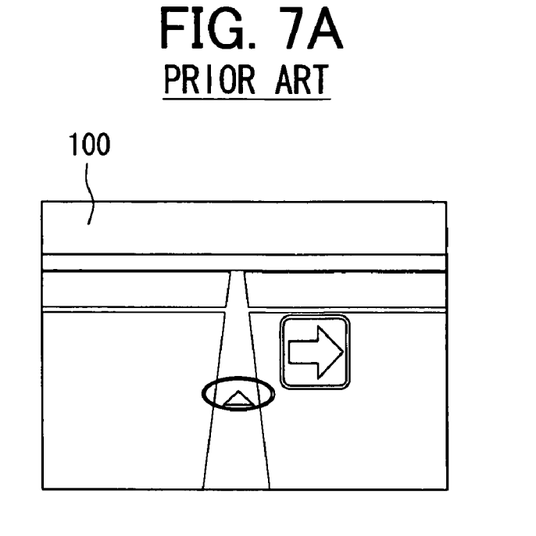
FIGS. 7A and 7B show illustrations of a driving support image in a conventional safety system.
Figure 7B:
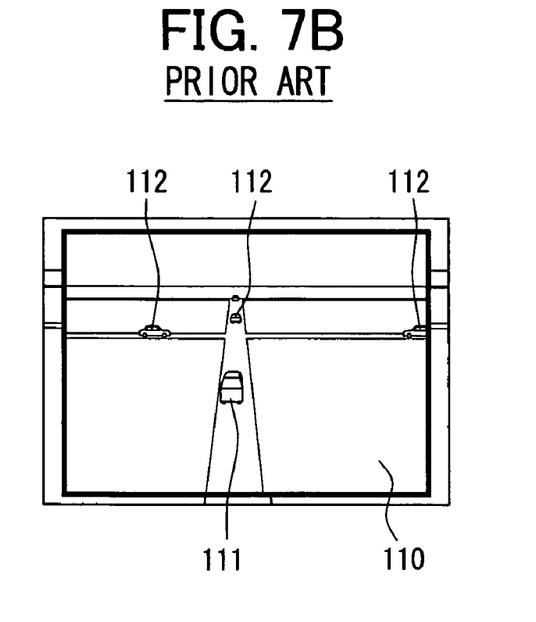

As an example in this type of preventive safety system for preventing accidents, a driving support image provided during a right turn at an intersection is shown in FIGS. 7A and 7B. That is, when a self-vehicle comes to a driving support image display area of the intersection with a right-turn instruction displayed on a navigation screen 100 as in an illustration in FIG. 7A, a driving support image 110 is displayed as a pop up screen as shown in FIG. 7B. In the driving support image 110, moving images of the self-vehicle 111 and other vehicles 112 etc. near the intersection are shown as superposed images on a bird's-eye view of the intersection.

By referring to the driving support image 110 when turning right at the intersection, a driver can recognize an oncoming vehicle etc. existing at locations which are hard to check visually by the driver.

Also, Japanese Patent Document JP-A-2005-11252 proposes an information providing device for a vehicle which provides a right turn collision-avoidance support service capable of preventing a collision with another vehicle which cannot be sighted during a right turn at an intersection.

Conventionally, according to a display method for a driving support image by a bird's-eye view of an intersection such as the driving support image 110 shown in FIG. 7B, the bird's-eye view used as a background is shown such that a line of sight in the image is directed frontward of a self-vehicle's traveling direction. In such a bird's-eye view, the self-vehicle is shown in a lower portion near a center of the right-and-left direction (front side in the bird's-eye view), and a frontward area of the traveling direction of the self-vehicle is shown in a longitudinal upper portion from the position of the self-vehicle (depth direction in the bird's-eye view). Moreover, corresponding to the turn of the vehicle, the line of sight in the driving support image is also rotated. This is to make it easier for a driver to recognize intuitively the correspondence between a road state in the driving support image and an actual road state by making a field of vision on a screen correspond to the driver's field of vision and displaying it.

Further, according to the method for displaying, as a driving support image, not a bird's-eye view in which the intersection is overlooked diagonally from the back of the self-vehicle but a plane image in which the vicinity of the intersection is overlooked from above, conventionally, the driving support image is often displayed such that a traveling direction of the self-vehicle is aligned with a longitudinal direction near the center of the right-and-left direction of the screen. In this case, the self-vehicle is shown in a lower portion of the screen, and the frontward of the traveling direction of the self-vehicle is shown in the upper portion of the screen.

However, when displaying the image of the intersection relating to driving support by the above method on a horizontally wide monitor commonly mounted on a vehicle, since a display range of the horizontally wide monitor is narrow in a vertical direction, the range for showing an opposite lane and oncoming vehicles in the frontward area of the traveling direction of the self-vehicle is narrow. In the driving support during a right turn at the intersection, it is disadvantageous for a driver to have a narrow range for displaying items of information including the opposite lane and oncoming vehicles, such information being important for the driver to decide whether or not to make the right turn.

Particularly, in a three-dimensional expression like the bird's-eye view in consideration of perspective representation, the frontward area in the traveling direction of the self-vehicle is displayed smaller in the upper portion of the screen in the depth direction in the bird's-eye view as it is shown farther from the self-vehicle. Therefore, in the driving support image during the right turn at the intersection, the oncoming vehicle is displayed small, which is hard to recognize for the driver. Moreover, when there are two or more oncoming vehicles in a row, rear vehicles are hidden by front vehicles on the screen. Therefore, it is sometimes difficult for the driver to recognize the presence of rear vehicles or a space between oncoming vehicles. Therefore, in the bird's-eye view in which the intersection is overlooked diagonally from the back of the self-vehicle and shown three-dimensionally, the problem described above is remarkable.

SUMMARY OF THE INVENTION

The present invention is made in view of the above and, with regard to displaying a driving support image during a right turn at an intersection, its object is to provide a technology for displaying the driving support image in such a manner that a driver can easily recognize a state ahead of a self-vehicle or a state into which the right turn is to be made.

The image display apparatus for use in a subject vehicle includes a driving support control unit for controlling a display of a driving support image, and the driving support image as a driving support for the subject vehicle is provided for the subject vehicle in a specific intersection when the subject vehicle is crossing an opposite lane for a change of direction at the specific intersection that is identified as a support image display area. Further, the driving support image is generated by superposing a subject vehicle image and an obstacle image on a background image of the intersection based on obstacle information of an obstacle in a proximity of the subject vehicle derived from an external information source, and the driving support image under control of the driving support control unit displays a second view for an increased coverage of one of an opposite lane ahead of the subject vehicle and a to-be-traveled lane by shifting a first view for a coverage of an initial traveling direction of the subject vehicle.

In this case, the background image may be a birds-eye image of three-dimensional represent of background with a depression angle of less than 90 degrees, or an image of a top view of the intersection in the support image display area with the depression angle of 90 degrees. Further, the first view may be a perspective view in a direction that is aligned to the initial travel direction of the subject vehicle, or may be a top view of the intersection with the initial traveling direction of the subject vehicle aligned to a vertical line at a center of, for example, a screen of a display unit. In this manner, the driver of the subject vehicle can intuitively recognize traffic condition in and around the intersection based on the driving support image.

Further, the shift of the driving support image from the first view to the second view, that is, from a straight-forward and conventional manner of a traffic view for the ease of intuitive recognition by the driver to a perspective prioritized manner of oncoming and/or after-turning traffic for an increased viewable area, facilitates a usability of the driving support image for the driver in terms of representation of an approaching vehicle and/or clearance of after-turning traffic in an easily measurable manner. The shift of the driving support image may be provided as a horizontally rotational shift of the first view, an increase of a depression angle (i.e., a downward rotational shift) of the first view, or a combination of these rotations.

Furthermore, the shift of the driving support image may be started at various timings for the ease of comparative recognition of traffic condition by the driver of the subject vehicle. That is, the first view may be shifted to the second view at a predetermined timing for fully incorporating a merit of displaying the first view by providing a certain recognition time for the driver. In this manner, the driver of the subject vehicle can obtain an overall traffic condition in an intuitive manner based on the first view, and can also obtain a detailed traffic condition based on the second view that generally inherits and preserves general features in the first view. In addition, the provision of the shift of the driving support image may be accompanied by a distinguishing action such as a pop-up of a support image screen with a blinking frame, a vocal and/or text message that notifies the driver of the provision of the support image.

The driving support image may be provided by having a computer program that operates a computer-based navigation system or the like on the subject vehicle.

BRIEF DESCRIPTION OF THE DRAWINGS

Other objects, features and advantages of the present invention will become more apparent from the following detailed description made with reference to the accompanying drawings, in which.

DETAILED DESCRIPTION

Preferred embodiments of the present invention will now be described with reference to the accompanying the drawings.

[Explanation of Configuration of Driving Support Image-Display Apparatus 1]

Figure 1:
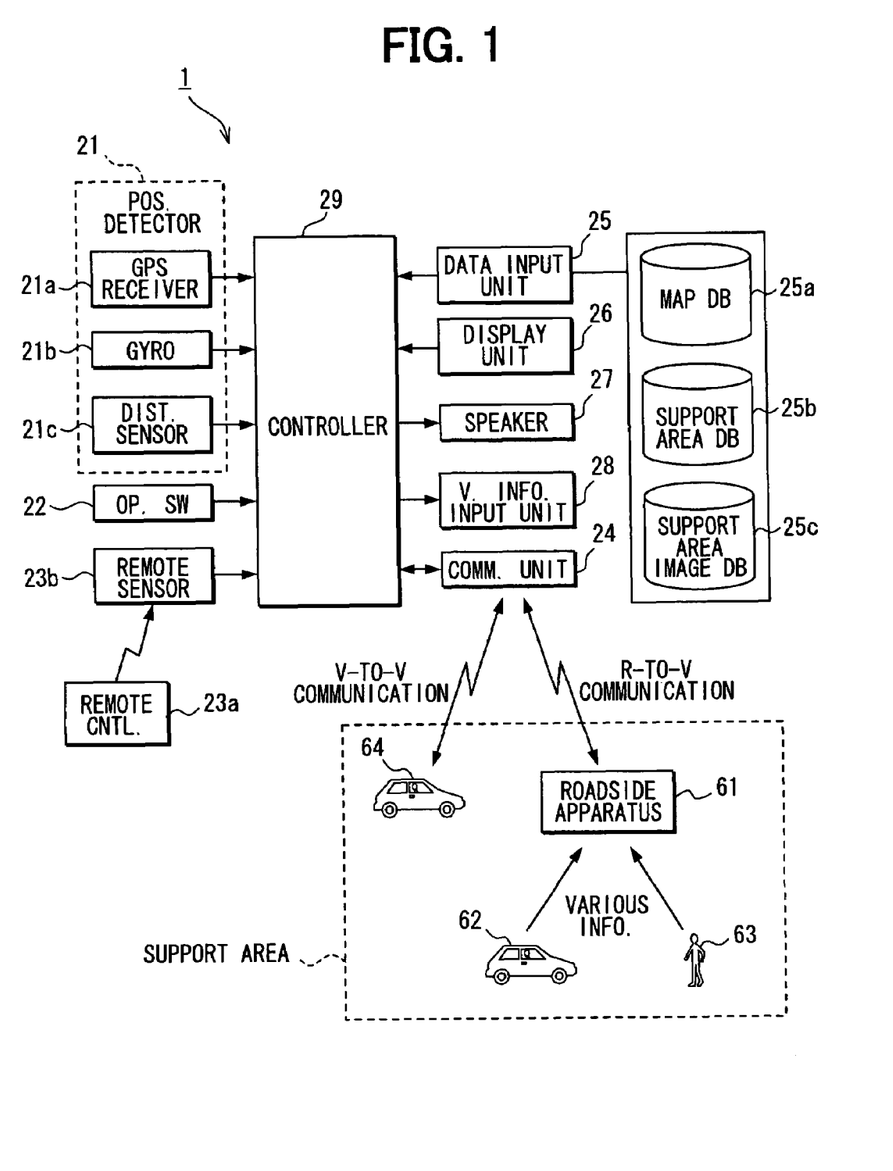
FIG. 1 shows a block diagram of a driving support image-display apparatus in association of an illustration of a support area in an embodiment of the present disclosure.

FIG. 1 is a block diagram showing a block diagram of a driving support images-display apparatus 1 with an illustration of a support area in an embodiment of the present disclosure.

As shown in FIG. 1, the driving support image-display apparatus 1 comprises: a position detector 21 which detects a current position of a vehicle; a group of operation switches 22 for inputting various instructions from a user; a remote-control terminal (hereafter called a "remote control") 23a which can input various instructions just like the group of operation switches 22; a remote control sensor 23b which inputs signals from the remote control 23a; a communication unit 24; a data input unit 25 which inputs data from an external storage medium storing various items of information including map data etc.; a display unit 26 which displays a map, a driving support image, etc; a voice output unit 27 which outputs various kinds of guide voices etc.; a vehicle-information input unit 28; and a controller 29.

The position detector 21 receives radio waves transmitted from a satellite for a GPS (Global Positioning System) through a GPS antenna. Further, the position detector 21 comprises: a GPS receiver 21a for detecting a position of a vehicle etc.; a gyroscope 21b for detecting the amount of rotational movement applied to the vehicle; and a distance sensor 21c for detecting a distance that the vehicle has traveled. The sensor etc. 21a to 21c have errors of different characteristics. Therefore, they are configured such that they compensate for each other. In addition, depending on the precision, some of the sensors only may be used. Alternatively, a rotation sensor for steering, a wheel sensor for each rolling wheel, etc. may be used.

For the group of operation switches 22, there are used a touch panel constructed with the display unit 26 as one piece and provided on its display surface as well as mechanical key switches provided around the display unit 26.

The communication unit 24 establishes communication between the self-vehicle and a roadside apparatus 61 for providing information installed in the support area such as an intersection where a driving support service through a communication antenna is provided. The communication unit 24 also establishes vehicle-to-vehicle communication between the self-vehicle and other vehicle 62 near the self-vehicle. The roadside apparatus 61 detects obstacles such as the other vehicle 62, a pedestrian 63, etc. in the support area, obtains their position information, speed information, or vehicle-type information of the other vehicle 62, and sends them to the self-vehicle traveling in the support area.

Further, in the vehicle-to-vehicle communication, from the communication unit mounted on the other vehicle 64, the position information, speed information, vehicle-type information, etc. of the vehicle are transmitted to the self vehicle traveling in the service range of the vehicle-to-vehicle communication (for example, between about tens of meters and hundreds of meters). Hereafter, the information sent from the roadside apparatus 61 and the other vehicles 64 to the self-vehicle is referred to as "provided information."

The communication unit 24 receives the provided information sent from the roadside apparatus 61 and other vehicle 64, and sends it to the controller 29.

According to the control by the controller 29, the data input unit 25 reads data from a nonvolatile storage medium and inputs it to the controller 29. The data stored in the nonvolatile storage medium are so-called map matching data for improving precision of the above position detection, a map database 25a including map data and route guidance data, a support area database 25b including information about a support area capable of providing a driving support service, a support-area image database 25c including support image data for displaying a driving support image, a program for activating the driving support image-display apparatus 1, etc. As a storage medium for the above data, a hard disk, a DVD, a CD-ROM, a memory, a memory card, etc. may be used.

Further, in the support-area image database 25c, two or more background images are stored. As a background image of the driving support image corresponding to an intersection of each support area, each of the two or more background images corresponds to each field of vision which is set by increasing the angle of rotation in increments of 1 degree from the background image corresponding to the initial field of vision (rotation angle of the field of vision is 0 degree) to a predetermined maximum value (for example, 45 degrees).

The display unit 26 is a color display unit which has a display surface of liquid crystal etc. The display unit 26 displays various images on its display surface according to image signals inputted by the controller 29. For example, when entering a specific support area where the driving support service is provided, a driving support image in which images of the self-vehicle, other vehicles, and pedestrians are superimposed on the background image of the support area, a message for the driving support, etc. can be displayed. Further, when traveling in an area other than the support area, as a navigation screen, additional data such as a mark indicating a current position specified by using the current position of the vehicle detected by the position detector 21 and the map data inputted through the data input unit 25, a guidance route to a destination, a name, a mark, symbols of various landmarks, etc. are superimposed and displayed.

The voice output unit 27 is configured to provide a user with various items of information in voice. Thereby, various guidance such as route guidance can be provided to the user through both the display by the display unit 26 and the voice output from the voice output unit 27.

The vehicle-information input unit 28 is for inputting various items of external information about a vehicle and, for example, inputs information about the vehicle transmitted from various ECUs (Electronic Control Units) of the vehicle etc.

The controller 29 consists mainly of a commonly known micro computer comprising a CPU, a ROM, a RAM, an I/O, and a bus line connecting these, etc., and controls each component described above. The controller 29 performs various processing related to the navigation, driving support, etc. according to programs read from the ROM or data input unit 25 etc.

For example, the navigation-related processing includes map display processing, route guidance processing, etc. The map display processing is the one which calculates, based on each detected signal through the position detector 21, a current position of the vehicle as a set of coordinates and a traveling direction, and displays a map around the current position read through the data input unit 25 on the display unit 26. Further, the route guidance processing is the one which calculates, based on the point data stored in the storage medium and the destination set according to the operation of the group of operation switches 22, the remote control 23a, etc., a route to the destination which is an optimal route from the current position to the destination, and performs traveling guidance for the route to the destination thus calculated. For setting the optimal route automatically, techniques such as cost calculation by Dijkstra method are known.

Further, as processing related to the driving support, there is "driving support image display processing" by using a pop-up window during the turn (Note: Supposing the left-hand traffic in the present embodiment, hereafter referred to as a "right turn." In the case of the right-hand traffic, it is equivalent to a left turn.) involving the crossing of the opposite lane at an intersection. In this "driving support image-display processing," provided information from an external source through the communication unit 24 is received during the right turn at the intersection. The "driving support image-display processing" further displays, based on the provided information, the driving support image on the display 26 by popping it up, the driving support image being made by superimposing moving images of obstacles including other vehicles such as oncoming vehicles and pedestrians on the background image corresponding to the intersection so that it can help the driver sight the obstacles such as oncoming vehicles.

Further, in the present embodiment, as a process in the above "driving support image-display processing," the controller 29 is configured so that it can perform the following processing. That is, after once displaying the above driving support image in a predetermined initial field of vision corresponding to the traveling direction of the self-vehicle, by rotating the field of vision of the currently shown driving support image from where the initial field of vision is, the controller 29 expands the range where the opposite lane ahead of the self-vehicle or the lane into which a turn is to be made is shown and displays the driving support image. This processing will be explained in detail later.

Also, the controller 29 in the present embodiment is equivalent to the driving support control means in the appended claims.

Now, "driving support image-display processing" performed by the controller 29 will be explained mainly using a flowchart of FIG. 2, by referring to FIGS. 3A to 5 as required.

[Explanation of Driving Support Image-Display Processing]

Figure 2:
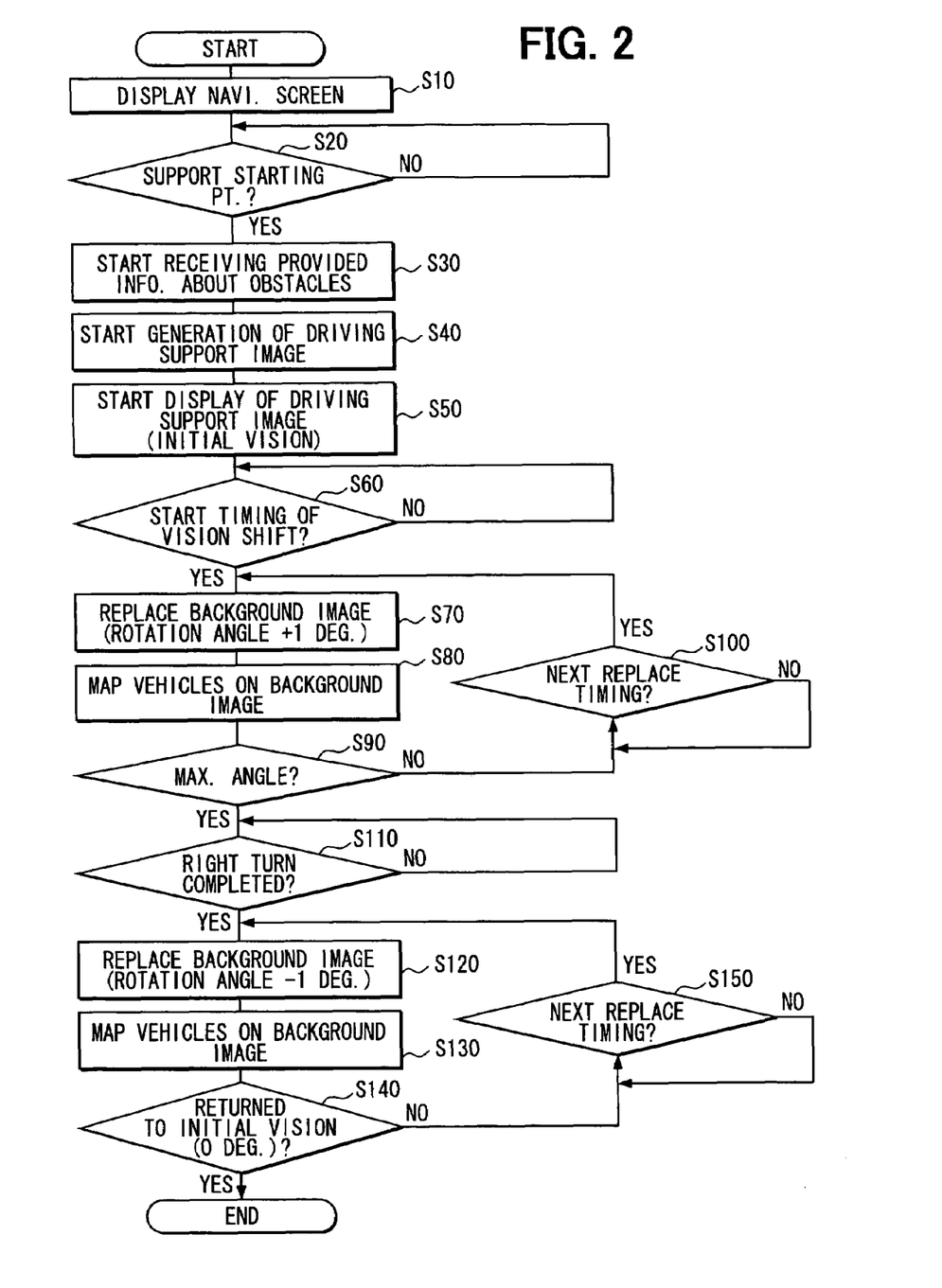
FIG. 2 shows a flowchart of a process in a controller of the driving support image-display apparatus in the embodiment.

FIG. 2 is a flowchart showing steps of main processing of the "driving support image-display processing" which the controller 29 of the driving support image-display apparatus 1 performs. Further, FIGS. 3A to 3E show illustrations of driving support images on the screen in the "driving support image-display processing."

Figure 3A:
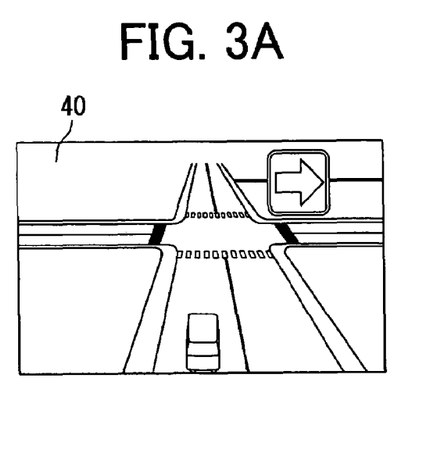
FIGS. 3A to 3E show illustrations of driving support images on a screen of the driving support image-display apparatus in the embodiment.

First, as the self-vehicle travels, based on the above map display processing and route guidance processing, a conventional navigation screen 40 as illustrated in FIG. 3A is shown (Step 10. Hereafter, "S" denotes "Step."). Then, based on a current position of the self-vehicle according to the detection result by the position detector 21 and position information of a support area stored in the support area database 25b, it is determined whether or not the self-vehicle has reached a support starting point before the intersection at which the self-vehicle is to turn right on the route to the destination (S20). In this regard, it may be determined whether or not the self-vehicle has reached the support starting point by receiving provided information from a roadside apparatus 61 installed in each support area.

When it is determined in S20 that the self-vehicle has not reached the support starting point (S20: NO), the processing is repeated. Also, while the processing is repeated, the navigation screen is being displayed. On the other hand, when it is determined that the self-vehicle has reached the support starting point in S20 (S20: YES), the self-vehicle starts receiving the provided information, through the communication unit 24, about obstacles existing in the support area from the roadside apparatus 61 installed in the support area and the other vehicle 64 near the self-vehicle (S30).

Then, the generation of the driving support image is started (S40). To be specific, first, through the data input unit 25, a background image (initial field of vision) corresponding to the support area stored in the support-area image database 25c is read out.

Then, based on the information detected by the position detector 21, point information from the data input unit 25, or speed information etc. from the vehicle-information input unit 28, an image of the self-vehicle is superimposed on its current position on the background image. Further, based on the provided information received, from the roadside apparatus 61 and the other vehicle 64 through the communication unit 24, images of obstacles such as vehicles around the self-vehicle and pedestrians are superimposed on their current positions on the background image.

Figure 3B:
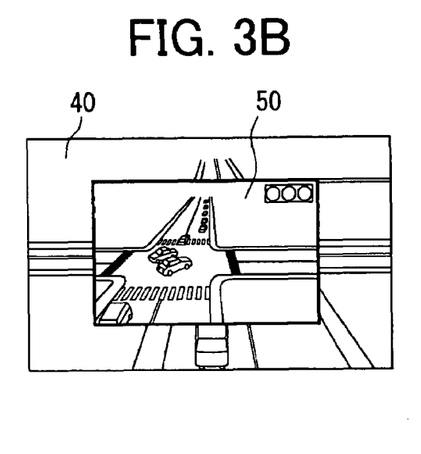
Figure 3C:
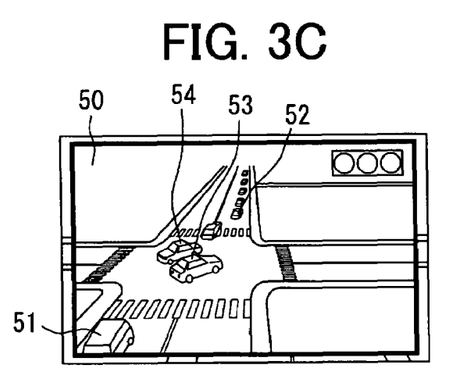

Further, with respect to the images of moving objects such as the self-vehicle, other vehicles, and pedestrians to be superimposed on the background image in the support area, they are superimposed on the background image as moving images having respective moving speeds. Then, in S50, the display of the driving support image (initial field of vision) generated in S40 is started. To be specific, as shown in FIGS. 3B and 3C, the driving support image 50 is popped up on the navigation screen 40. In this regard, the display of the driving support image 50 may be started with moving images in which the driving support image 50 pops up on the screen. Alternatively, the start of the display of the driving support image 50 may be informed by outputting, through the voice output unit 27, a voice message announcing "Display of the driving support image is started" or a suitable sound effect. In this way, the driver may be informed of the start of the display of the driving support image 50.

Figure 4A:
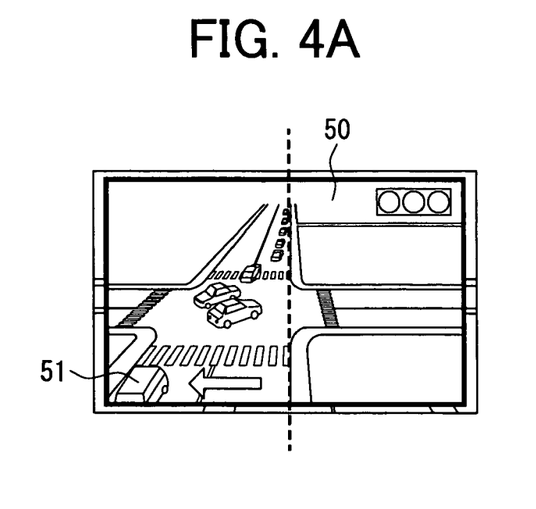
FIGS. 4A and 4B show illustrations of vision shifting in the screen of the driving support image-display apparatus in the embodiment.
Figure 4B:
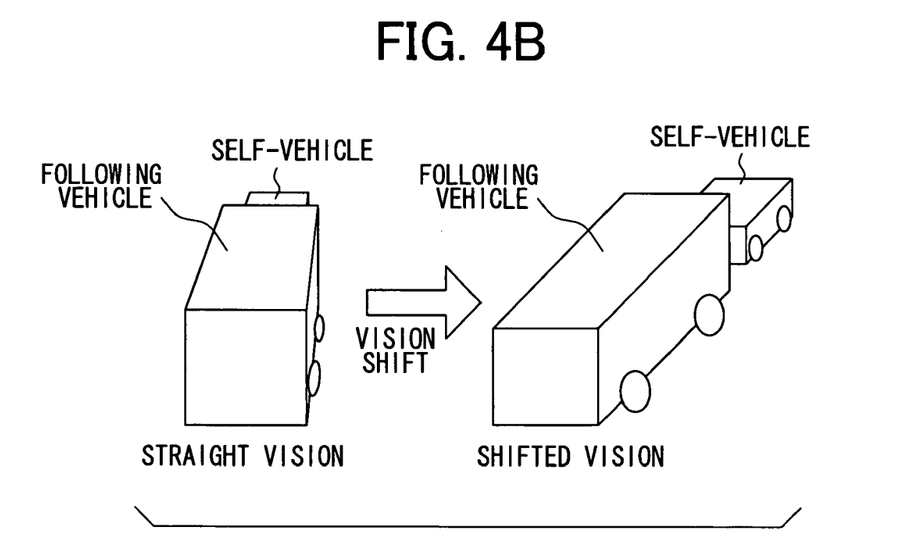

As shown in FIG. 3C, on the driving support image 50, moving images of the self-vehicle 51 and other vehicles such as an oncoming vehicle 52, a vehicle 53 leading the others, and an oncoming right-turning vehicle 54 are superimposed on a bird's-eye view of the intersection 50. In addition, when the display of the driving support image 50 is started in S50, the driving support image 50 is shown in the initial field of vision in which the line of sight in the image is generally directed frontward of the traveling direction of the self-vehicle. Moreover, in the present embodiment, as shown in FIG. 4A, the initial field of vision of the driving support image 50 is shifted somewhat rightward from the position where the self-vehicle 51 is shown, which is the center of the right-and-left direction of the screen. That is, a viewing point of the support image 50 shifts rightward, thereby providing the support image 50 that displays diagonally leftward direction relative to a direction of the traveling lane of the self-vehicle after vision shifting. Thus, by sliding the field of vision of the driving support image 50 from the position at the center of the right-and-left direction of the screen, the lane to which the self-vehicle 51 belongs is displayed as if it were seen somewhat sideways and diagonally. Therefore, as shown in FIG. 4B, even when a large-sized vehicle is following immediately behind the self-vehicle on the screen, the present embodiment can prevent the self-vehicle and the following vehicle from overlapping, which would otherwise make the self-vehicle difficult to be seen.

Now, the explanation of the flowchart of FIG. 2 will be continued. After starting the display of the driving support image (initial field of vision) in S50, it is determined whether or not it is time (starting point of shifting the field of vision) for starting the shift of the field of vision of the currently shown driving support image (S60). To be specific, it may be determined whether or not it is time for starting the shift of the field of vision of the driving support image by determining, after starting the display of the driving support image in the initial field of vision in S50, whether or not a predetermined time (for example, between several seconds and tens of seconds) has elapsed or determining, after starting the display of the driving support image in the initial field of vision, whether or not the self-vehicle has traveled a predetermined distance (for example, between tens of meters and hundreds of meters).

When it is determined that it is not the time for starting the shift of the field of vision of the driving support image in S60 (S60: NO), the processing in S60 is repeated. On the other hand, when it is determined in S60 that it is time for shifting the field of vision of the driving support image (S60: YES), namely, after starting the display of the driving support image in the field of vision in S50, when it is determined that the predetermined time has elapsed, or when it is determined that the self-vehicle has run a predetermined distance, a background image corresponding to a field of vision by increasing the rotation angle, by 1 degree, of the field of vision of the background image of the driving support image currently shown is read from the support area image database 25c, and the background of the driving support image is replaced with the background image thus read (S70).

Then, with respect to the replaced background image, images of the self-vehicle and obstacles such as vehicles around the self-vehicle and pedestrians are superimposed on respective positions in the background image (S80).

Figure 3D:
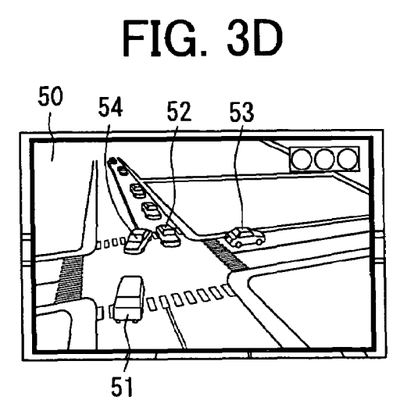

FIG. 3D is an example of a screen which shows a state in which the field of vision of the driving support image 50 is being rotated. As shown in FIG. 3D, by rotating the field of vision of the driving support image 50 rightward from where the initial field of vision is (see FIG. 3C), the opposite lane ahead of the self-vehicle 51 is shown, inclining towards the direction of a horizontal axis of the screen.

In S90, it is determined whether or not the rotation angle of the field of vision of the current driving support image has reached a predetermined maximum angle (for example, 45 degrees). When it is determined that the rotation angle of the field of vision has not reached the predetermined maximum angle (S90: NO), based on a predetermined relation, as shown in a diagram of FIG. 5, between a distance D from the position of the self-vehicle to a reference point (for example, a center of the intersection) in the support area and a field-of-vision shift amount M (in this case, a rotation angle) of the background image, it is determined whether or not it is time for replacing the current background image with the next background image (S100).

Figure 5:
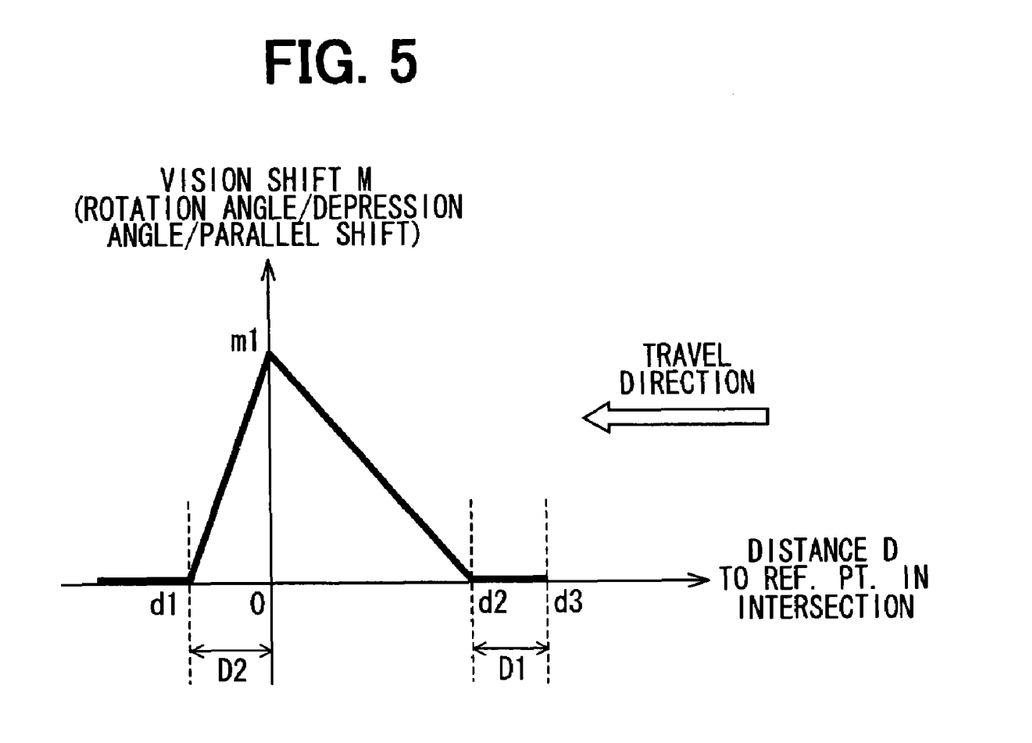
FIG. 5 shows a diagram of a relationship between a distance D to an intersection and a shift amount M of vision shifting in the embodiment.

FIG. 5 is the diagram showing an example of the relation between the distance D from the position of the self-vehicle to the predetermined reference point at the intersection in the driving support area and the field-of-vision shift amount M of the background image for defining timing of processes from starting the display of the driving support image to starting the shift completing the return of the field of vision of the driving support image.

As shown in FIG. 5, by reaching a support starting point where the distance D=d3, the display of the driving support image in the initial field of vision (field-of-vision shift amount M=0) is started. While the self-vehicle is traveling in the zone between a point where the distance D=d3 and a point where the distance D=d2, the driving support image is kept displayed in the initial field of vision where the field-of-vision shift amount M=0. Then, at the field-of-vision shift starting point where the distance D=d2, the shift of the field of vision of the driving support image is started. An interval D1 between the point where the distance D=d3 which is the support starting point and the point where the distance D=d2 which is the field-of-vision shift starting point may be a predetermined fixed value (for example, between tens of meters and hundreds of meters). Alternatively, it may be a distance that the self-vehicle travels, at the same speed as the one at the support starting point, for a predetermined time period (for example, between several seconds and tens of seconds).

After reaching the field-of-vision shift starting point, from the field-of-vision shift point (distance D=d2) to the reference point (distance D=0) at the intersection, the field of vision of the driving support image is gradually shifted while having the distance D correlate to the field-of-vision shift amount M so that the field-of-vision shift amount M may be a maximum shift amount m1 at the reference point (distance D=0) at the intersection.

Namely, in S100 of the flowchart of FIG. 2, based on the rotation angle of the field of vision of the current driving support image and the distance from the current position of the self-vehicle to the reference point at the intersection, the timing with which the current background image is replaced with the next background image so as to correspond to a proportional relationship between the distance D and the field-of-vision shift amount M shown in FIG. 5 is determined.

When it is determined that it is not the time for replacing the current background image with the next background image (S100: NO), the processing is repeated. When it is determined, in S100, that it is time for replacing the current background image with the next background image (S100: YES), the process advances to S70. In S70, there is read out, from the support-area image database 25c, a background image corresponding to a field of vision set by increasing the rotation angle of the field of vision of the background image of the currently shown driving support image by 1 degree, and the background of the driving support image is replaced with the background image thus read out.

Hereafter, the processing from S70 to S90 is successively repeated. In S90, when it is determined that the rotation angle of the field of vision in the current driving support image has reached the predetermined maximum angle (S90: YES), the process advances to S110.

Figure 3E:
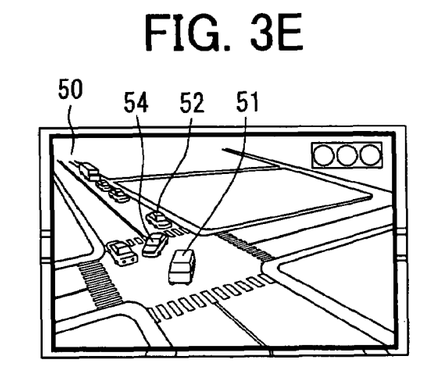

FIG. 3E is an example of a screen showing a state in which the rotation of the field of vision of the driving support image 50 has been completed. In the example of FIG. 3E, a maximum value of the rotation angle is set to a state wherein the field of vision of the driving support image 50 is rotated by about 45 degrees rightward from the initial field of vision (see FIG. 3C). Thus, by rotating the field of vision of the driving support image 50 from a state where the opposite lane ahead of the self-vehicle 51 is shown in the vertical (short axis) direction of the screen to incline the opposite lane in the horizontal (long axis) direction of the screen, the opposite lane is shown, inclining diagonally on the screen. Also, compared to the case where it is shown in the vertical direction on the screen, the opposite lane is shown wider. Moreover, with respect to a road into which a right turn is to be made, its display range can also be widened.

Now, the description of the flowchart of FIG. 2 will be continued. In S110, it is determined whether or not the right turn of the self-vehicle at the intersection has been completed. To be specific, it may be determined whether or not the right turn of the self-vehicle is completed according to the orientation of the self-vehicle based on information detected by the position detector 21 and operation information etc. of the steering obtained through the vehicle-information input unit 28. When it is determined that the right turn has not been completed (S10: NO), the processing is repeated.

When it is determined, in S110, that the right turn has been completed (S110: YES), the background image corresponding to a field of vision set by rotating the field of vision of the background image of the currently shown driving support image by −1 degree (namely, rotating in a direction to return to the initial field of vision) is read from the support-area image database 25c. Then, the background of the driving support image is replaced with the background image thus read out (S120). With respect to the replaced background image, images of the self-vehicle and obstacles such as vehicles and pedestrians around the self-vehicle are superimposed on their current positions in the background image (S130).

Then, it is determined whether or not the rotation angle of the field of vision in the current driving support image has reached 0 degree, namely, it is determined whether or not the field of vision of the driving support image has returned to where the initial field of vision is (S140). In this regard, when it is determined that the rotation angle of the field of vision has not reached 0 degree, namely, it is determined that the field of vision of the driving support image has not returned to where the initial field of vision is (S140: NO), based on the predetermined relation, as shown in the diagram of FIG. 5, between the distance D from the position of the self-vehicle to the reference point in the support area and the field-of-vision shift amount M (in this case, the rotation angle), it is determined whether or not it is time for replacing the current background with the next background image (S150).

As shown in FIG. 5, after the right turn, returning of the field of vision of the driving support image is started from a state in which the field-of-vision shift amount M is the maximum value of m1 where the distance D=0. From the point where the distance D=0 to a field-of-vision returning point (distance D=d1), the field of vision of the driving support image is gradually shifted while the distance D being in proportion to the field-of-vision shift amount M so that the field-of-vision shift amount M at the field-of-vision returning point (distance D=d1) may be 0, or the field of vision of the driving support image may return to the initial field of vision. Also, an interval D2 between the point where the distance D=0 and the point where the distance D=d1, which is the field-of-vision returning point, may be set to a predetermined fixed value (for example, tens of meters).

Namely, in S150, based on a rotation angle of the field of vision in the current driving support image and a distance from the current position of the self-vehicle to the reference point of the intersection, the timing for replacing the present background image with the next background image is determined so as to correspond to the proportional relation between the distance D and the field-of-vision shift amount M as shown in the diagram of FIG. 5.

When it determined that it is not the time for replacing the present background image with the next background image in S150 (S150: NO), the processing is repeated. And, when it is determined that it is time for replacing the present background image with the next background image in S150 (S150: YES), the process advances to S120. Namely, there is read out a background image corresponding to a field of vision set by rotating the field of vision of the background image of the currently shown driving support image by −1 degree (namely, rotating in the direction to return to the initial field of vision), and the background of the driving support image is replaced with the background image thus read out.

Hereafter, the steps from S120 to S140 are successively repeated. When it is determined that the rotation angle of the field of vision has reached 0 degree in S140, namely, when it is determined that the background image has returned to the initial field of vision (S140: YES), "the driving support image-display processing" is ended.

[Advantageous Effect]

According to the driving support image-display apparatus 1 of the above embodiments, the following effects can be obtained.

According to the driving support image-display apparatus 1 of the above embodiment, it is possible to rotate the initial field of vision (see FIG. 3C) originally corresponding to the traveling direction of the self-vehicle so that the driver can easily and intuitively recognize the relation between the road state in the driving support image and the actual road state in such a manner that the opposite lane inclines toward the horizontal (longitudinal axis) direction of the screen (see FIG. 3E). Therefore, it becomes possible to display the driving support image such that the range where the opposite lane ahead of the self-vehicle and the lane into which the self-vehicle turns are shown may be expanded. Thus, the display of driving support images in which the driver can easily recognize oncoming vehicles, the state of a road into which a right turn is to be made, etc. during the right turn can be achieved.

Particularly, as in the driving support image-display apparatus 1 of the above embodiment, when using a bird's-eye view as a background image of the driving support image, even in the case where a series of two or more oncoming vehicles are overlapped when they are displayed in the vertical direction on the screen, by rotating the field of vision and displaying the opposite lane diagonally, the series of two or more oncoming vehicles are prevented from being displayed in an overlapping manner. Therefore, it becomes easier for the driver to recognize a space between oncoming vehicles etc. than the case of seeing the state of such a series of oncoming vehicles from the front.

Moreover, as shown in FIG. 5, after once showing the driving support image in the initial field of vision when reaching the support starting point, by shifting the field of vision of the currently shown driving support image from the initial field of vision at the field-of-vision shift starting point after having run a predetermined distance D1, first, the driver can recognize the precise relation between the road state in the driving support image and the actual road state by the driving support image shown in the initial field of vision corresponding to the driver's field of vision. Then, the driver can recognize more accurately the state of the opposite lane ahead or the lane into which a right turn is to be made, with the correspondence between the road state in the driving support image and the actual road state being grasped by changing the field of vision of the driving support image. Namely, the above embodiment can realize both the merit in the case of displaying the driving support image in the initial field of vision which corresponds to the driver's field of vision and the merit in the case of shifting the field of vision of the driving support image from the initial field of vision and displaying it.

Moreover, as shown in FIG. 5, after passing the field-of-vision shift starting point (distance D=d2), by showing the driving support information by continuously shifting the field of vision while the field-of-vision shift amount M of the driving support image being proportional to the distance D, the field of vision of the driving support image can be gradually shifted as the self-vehicle approaches the intersection in the driving support area. Accordingly, the driver can smoothly adjust himself or herself to the change in the background in the driving support image.

Further, when starting the display of the driving support image, by showing the driving support image by popping it up (see FIG. 3B) and by giving the driver a message informing that the driving support image is to be displayed, it is possible to notify the driver that the display of the driving support image has been started. Accordingly, it is possible, in a scene where the driving support is necessary, to turn the driver's attention to the driving support image at an appropriate timing and to sufficiently achieve the effect of the driving support.

Although the present invention has been fully described in connection with the preferred embodiment thereof with reference to the accompanying drawings, it is to be noted that various changes and modifications will become apparent to those skilled in the art.

For example, in the above embodiment, as a specific example for shifting the field of vision of the driving support image, an example of rotating the field of vision of the driving support image is shown. However, in addition to the method of rotating the field of vision of the driving support image, as shown in FIGS. 6A to 6E, there is a method of changing the depression angle in the field of vision of the driving support image from the one in the initial field of vision.

FIGS. 6A to 6E show, as another embodiment of the "driving support image-display processing," screens wherein the depression angle in the field of vision of the driving support image is varied.

Figure 6A:
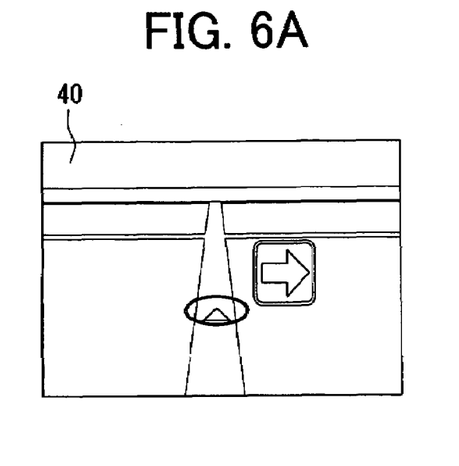
FIGS. 6A to 6E show illustrations of vision shifting in the screen of the driving support image-display apparatus in another embodiment.
Figure 6B:
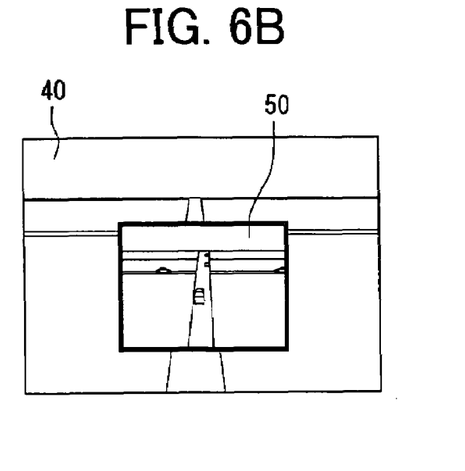
Figure 6C:
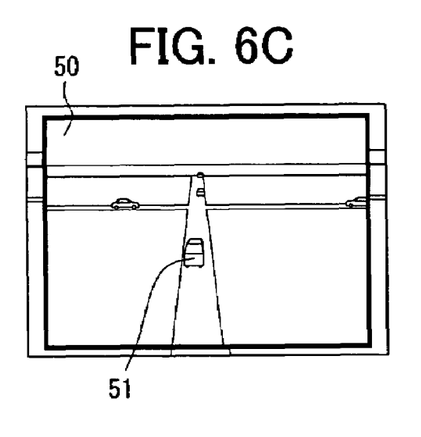
Figure 6D:
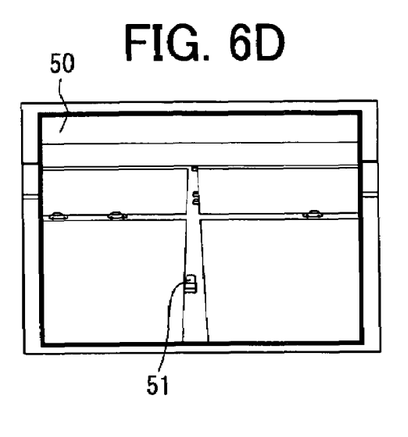
Figure 6E:
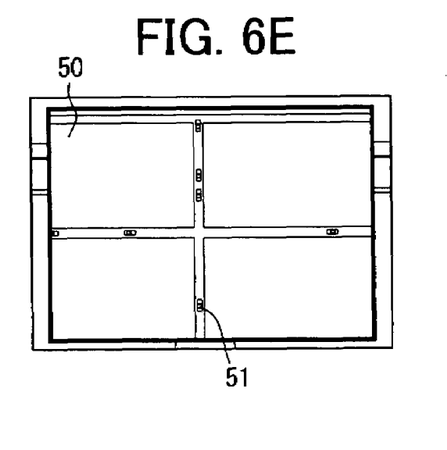

In this case, as in the above embodiment, when reaching the support starting point while a navigation screen 40 such as FIG. 6A is displayed, as shown in FIG. 6B, by popping up a driving support image 50 on the navigation screen 40, the display of the driving support image 50 in the initial field of vision is once started (see FIG. 6C). Then, instead of rotating the field of vision like in the processing from S70 to S100 of the flowchart of FIG. 2, as shown in FIG. 6D, the depression angle is increased to a predetermined maximum value by gradually increasing the depression angle of the field of vision of the driving support image 50 (see FIG. 6E). FIG. 6E is a top view showing an example of the display of the driving support image 50 wherein the depression angle is increased to 90 degrees.

In this regard, in order to gradually increase the depression angle of the field of vision of the driving support image 50, as shown in FIG. 5, the depression angle may be increased with timing based on a predetermined relation between the distance D from the position of the self-vehicle to the reference point in the support area (for example, the center of an intersection) and the field of vision shift amount M (in this case, the depression angle) of the background image.

Thus, by increasing the degree of the depression angle of the field of vision in the driving support image 50 more than that of the depression angle of the initial field of vision, it becomes possible to expand the display range on the screen wherein the opposite lane ahead of the self-vehicle 51 or the lane into which the right turn is to be made is shown. Accordingly, the expanded range enables the driver to more easily recognize the state of the opposite lane ahead of the self-vehicle or the lane into which the right turn is to be made.

Further, as a specific method for shifting the field of vision of the driving support image from the initial field of vision, there is a method of moving the field of vision of the driving support image in parallel to the initial field of vision.

In the above embodiment, as the initial field of vision of the driving support image, as shown in FIG. 4A, the one which is slid somewhat rightward from the position where the self-vehicle 51 is shown at the center of the right-and-left direction of the screen is used. Instead of starting the display of the driving support image in such an initial field of vision which is slid sideways in advance, a driving support image in the slid field of vision like the driving support image 50 of FIG. 4A may be displayed, for example, by starting the display of the driving support image in the initial field of vision wherein the self-vehicle 51 is positioned at the center of the right-and-left direction of the screen and by gradually shifting in parallel the field of vision in the processing similar to the one between S70 and S100 of the flowchart in FIG. 2.

In this regard, in order to gradually shift the field of vision of the driving support image 50 in parallel, as shown in FIG. 5, the field of vision may be shifted in parallel with the timing based on the predetermined relation between the distance D from the position of the self-vehicle to the reference point (for example, the center of the intersection) in the support area and the field-of-vision shift amount M (in this case, parallel-shift amount) of the background image.

Instead of shifting the field of vision of the driving support image sideways, the field of vision of the driving support image may be shifted forward in the longitudinal direction where the opposite lane is shown. Alternatively, the field of vision of the driving support image may be shifted diagonally by combining movement in the vertical direction and horizontal direction. Thus, also by shifting the field of vision of the driving support image in parallel to the initial field of vision, the display range of the opposite lane or the road into which a right turn is made in the driving support image can be made larger than the display range in the initial field of vision.

In the above embodiment, as a background image of the driving support image, the example using a bird's-eye view wherein the vicinity of the intersection is viewed diagonally from the upper back of the self-vehicle has been described. However, the technical idea of the present invention can be applied even to the case of using, as a background image of the driving support image, a plane image wherein the vicinity of the intersection is viewed from the above.

Such changes and modifications are to be understood as being within the scope of the present invention as defined by the appended claims.

What is claimed is:

1. An image display apparatus for use in a subject vehicle comprising:
    a driving support control unit configured to control a display of a driving support image, wherein
        the driving support control unit provides the driving support image for the subject vehicle in a specific intersection, identified as a support image display area, when the subject vehicle crosses an opposite lane thereby changing direction at the specific intersection;
        the driving support control unit generates the driving support image by superimposing a subject vehicle image and an obstacle image on a background image of the intersection, based on obstacle information of an obstacle in a proximity of the subject vehicle derived from an external information source; and
        the driving support image, under control of the driving support control unit, displays a second view for an increased coverage of one of an opposite lane ahead of the subject vehicle and a to-be-traveled lane by shifting a first view for a coverage of an initial traveling direction of the subject vehicle.

2. The image display apparatus as in claim 1, wherein
the driving support image under control of the driving support control unit displays the second view for an increased coverage of one of the opposite lane ahead of the subject vehicle and the to-be-traveled lane by panning the first view for the coverage of the initial traveling direction of the subject vehicle.

3. The image display apparatus as in claim 1, wherein
the driving support image under control of the driving support control unit displays the second view for an increased coverage of one of the opposite lane ahead of the subject vehicle and the to-be-traveled lane by applying parallel shift to the first view for the coverage of the initial traveling direction of the subject vehicle.

4. The image display apparatus as in claim 1, wherein
the driving support image under control of the driving support control unit displays the second view for an increased coverage of one of the opposite lane ahead of the subject vehicle and the to-be-traveled lane by changing a depression angle of the first view for the coverage of the initial traveling direction of the subject vehicle.

5. The image display apparatus as in claim 1, wherein
the driving support image under control of the driving support control unit shifts the first view at a predetermined shift timing after displaying the first view at a predetermined initial display timing.

6. The image display apparatus as in claim 5, wherein
the driving support image under control of the driving support control unit continuously shifts the first view to a predetermined maximum shift amount at a predetermined shift speed after the predetermined shift timing.

7. The image display apparatus as in claim 1, wherein
the driving support control unit generates the driving support image as a pop-up image when the subject vehicle reaches the support image display area, and
the driving support control unit provides a message of the generation of the driving support image for a driver of the subject vehicle.

8. A computer program stored on a retrievable storage medium for controlling a computer comprising:
    providing a driving support control that controls the computer to serve as the driving support control unit in claim 1.

* * * * *